W. CHESTER.
Devices for Cutting Off and Dressing the Ends of Tubes.
No. 155,143.            Patented Sept. 22, 1874.
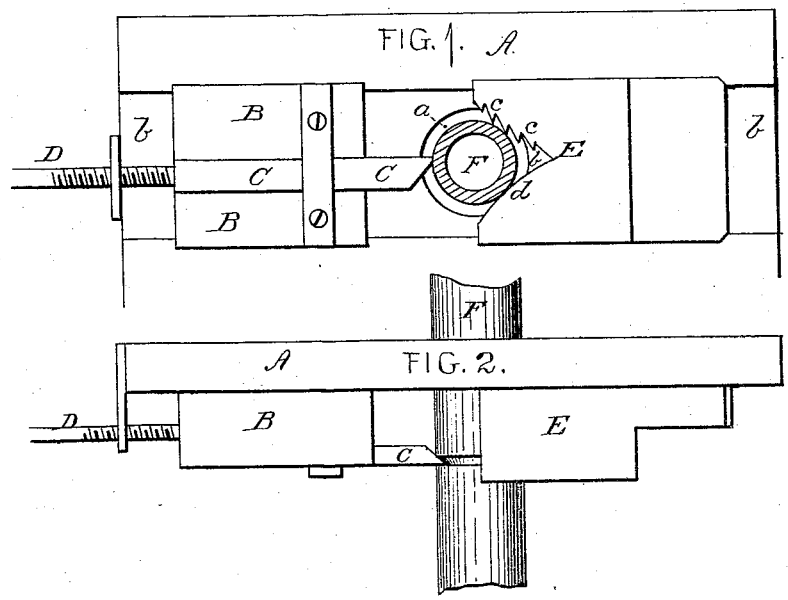
WITNESSES.
INVENTOR.

UNITED STATES PATENT OFFICE.

WILLIAM CHESTER, OF NEW YORK, N. Y., ASSIGNOR TO R. HOE & CO., OF SAME PLACE.

IMPROVEMENT IN DEVICES FOR CUTTING OFF AND DRESSING THE ENDS OF TUBES.

Specification forming part of Letters Patent No. 155,143, dated September 22, 1874; application filed July 6, 1874.

*To all whom it may concern:*

Be it known that I, WILLIAM CHESTER, of New York, in the county of New York and State of New York, have invented an Improved Attachment for Lathes for Cutting Piping, Shafting, &c., of which the following is a specification:

My invention relates to lathes for cutting or turning metal pipes or shafts; and consists in a novel construction, combination, and arrangement of parts which have for their object to cut the shaft or pipe into lengths and remove the outer skin or surface of the metal at one operation, as will be fully hereafter set forth.

Figure 1 is a transverse sectional elevation of a lathe provided with my improvement. Fig. 2 is a top view of Fig. 1.

A represents a portion of the frame of a lathe, provided with a hole, $a$, at its middle, through which the pipe to be cut passes. B is a block sliding in the groove $b$ in the frame A. C is the cutting-tool, secured to the head B. D is a screw for feeding the cutting-tool up to the pipe or shaft to be cut. E is a block situated opposite to the cutting-tool C on the frame A. This block has an angular recess or groove, $b$, cut transversely of its face, and the upper side of this groove is serrated or provided with cutting-teeth $c$ $c$.

The pipe or shaft F to be cut is secured in a chuck or mandrel, and passed through the hole $a$. The pipe or shaft being rotated, the tool C and block E are moved up to it, till the sides of the angular recess in the block E are in close proximity thereto. The pressure of the tool C, as it is fed up to and cuts into the pipe, will press it (the pipe) against the sides of the recess in the block E, and as the pipe revolves its skin or rough exterior will be turned off by the serrated or cutting surface of the recess, and thus both operations of cutting off the lengths of pipe or shafting and "truing up" the periphery at the extremity of the pipes, to facilitate threading, fitting, &c., are accomplished at once, while, at the same time, the block E acts as a support for the pipe or shaft during the operation of cutting.

The surfaces of the recess in the block E are slightly concave, as shown, and one, $d$, is made smooth, to obviate friction.

It will be perceived that by having the recess in the block angular any size of pipe that can enter it can be accommodated, and be held firm for the cutting-tool to operate upon.

I claim—

The combination, with the cutting-tool C, of the block E, with its angular recess, one surface of which is provided with cutting-teeth, whereby the work is cut into lengths and smoothed on its periphery at the extremity by one operation, substantially in the manner described and specified.

WILLIAM CHESTER.

Witnesses:
  STEPHEN S. HOE,
  GIRARD MCENTEE.